(12) United States Patent
Zhong et al.

(10) Patent No.: US 9,632,352 B2
(45) Date of Patent: Apr. 25, 2017

(54) FLEXIBLE LIQUID CRYSTAL DISPLAY (71) Applicant: Shenzhen China Star Optoelectronics Technology Co., Ltd., Shenzhen (CN)

(72) Inventors: Xinhui Zhong, Shenzhen (CN); Yungjui Lee, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 38 days.

(21) Appl. No.: 14/762,795

(22) PCT Filed: May 20, 2015

(86) PCT No.: PCT/CN2015/079381
§ 371 (c)(1),
(2) Date: Jul. 22, 2015

(87) PCT Pub. No.: WO2016/161695
PCT Pub. Date: Oct. 13, 2016

(65) Prior Publication Data
US 2017/0045775 A1    Feb. 16, 2017

(30) Foreign Application Priority Data
Apr. 7, 2015 (CN) .......... 2015 1 0162022

(51) Int. Cl.
*G02F 1/1335* (2006.01)
*G02F 1/1333* (2006.01)
(Continued)

(52) U.S. Cl.
CPC ..... *G02F 1/133514* (2013.01); *G02B 6/0055* (2013.01); *G02B 6/0065* (2013.01); *G02F 1/1337* (2013.01); *G02F 1/1368* (2013.01); *G02F 1/13439* (2013.01); *G02F 1/133305* (2013.01); *G02F 1/133512* (2013.01); *G02F 1/133528* (2013.01); *G02F 1/134309* (2013.01); *G02F 1/136286* (2013.01);
(Continued)

(58) Field of Classification Search
CPC ............ G02F 1/133514; G02B 6/0055; G02B 6/0065
USPC .......................................... 349/106
See application file for complete search history.

(56) References Cited

U.S. PATENT DOCUMENTS

2012/0242610 A1* 9/2012 Yasumatsu .............. G06F 3/045
345/173

* cited by examiner

*Primary Examiner* — Lucy Chien
(74) *Attorney, Agent, or Firm* — Leong C. Lei (57) ABSTRACT

The present invention provides a flexible liquid crystal display, comprising a flexible backlight module and a flexible liquid crystal display panel positioned on the flexible backlight module, and the flexible liquid crystal display panel comprises a lower polarizer, an array substrate, a liquid crystal layer, a color filter substrate and an upper polarizer from bottom to top in sequence; the color filter substrate comprises a first substrate, a color filter layer positioned on the first substrate, a flat layer positioned on the color filter layer, a common electrode layer positioned on the flat layer, a black matrix block wall positioned on the common electrode layer; wherein the common electrode layer comprises a plurality of electrode blocks, which are separately positioned, and the plurality of electrode blocks are electrically connected with metal lines to prevent that the brittle rupture of the common electrode layer happens during the bending operation.

15 Claims, 5 Drawing Sheets

(51) Int. Cl.
    *G02F 1/1362* (2006.01)
    *G02F 1/1368* (2006.01)
    *G02F 1/1343* (2006.01)
    *F21V 8/00* (2006.01)
    *G02F 1/1337* (2006.01)
(52) U.S. Cl.
    CPC ............ *G02F 2001/133742* (2013.01); *G02F 2001/134318* (2013.01); *G02F 2201/121* (2013.01); *G02F 2201/122* (2013.01); *G02F 2201/52* (2013.01)

FLEXIBLE LIQUID CRYSTAL DISPLAY

FIELD OF THE INVENTION

The present invention relates to a display technology field, and more particularly to a flexible liquid crystal display.

BACKGROUND OF THE INVENTION

With the gradual population of wearable application equipments, such as smart glasses, smart phone, et cetera, the demands to flexible display in the display industry have constantly increased.

An Organic Light Emitting Diodes Display (OLED) possesses properties of self-illumination, no required back light, being ultra thin, wide view angle, fast response and etc., and accordingly has the nature advantage of flexible display. However, the OLED industry remains the extremely high bar of technology. The difficulty of the manufacture process is high. The yield is low and the cost, the selling price are high. These drawbacks get in way of wide applications of the OLED.

The Liquid Crystal Display (LCD) is the most widely used display product in the present market. The production technology is quite mature. The yield of the production is high. The cost is relatively low and the acceptance is high in the market.

For the TFT-LCD panels in the present main market, three types can be illustrated, which respectively are Twisted Nematic/Super Twisted Nematic (TN/STN), In-Plane Switching (IPS) and Vertical Alignment (VA). Although the principles of respective liquid crystal display adjustments have some differences. The basic structures of these three type liquid crystal panels are more similar.

Figure 1:
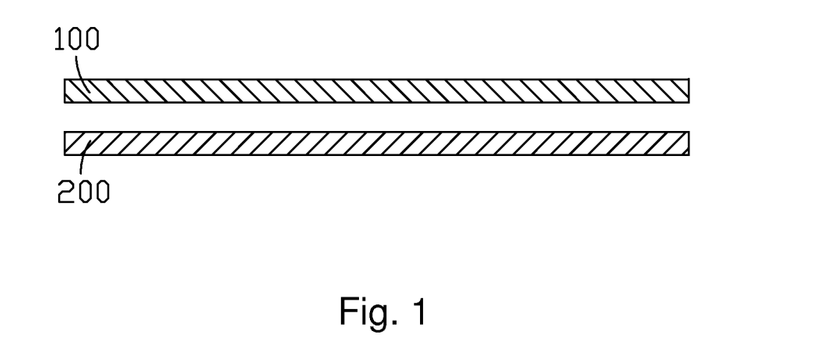
FIG. 1 is a basic structure diagram of a liquid crystal display according to prior art.
Figure 2:
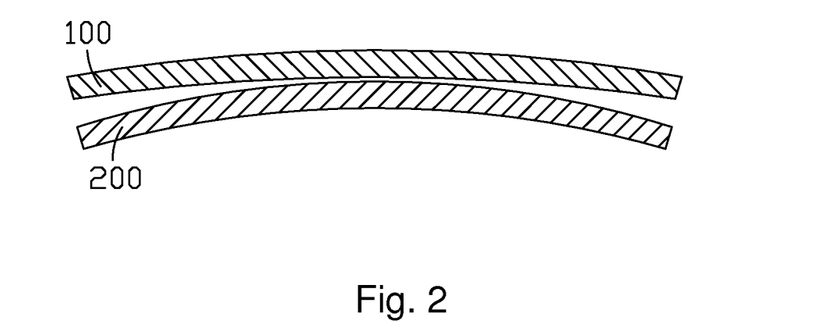
FIG. 2 is a diagram of a liquid crystal display according to prior art applied for flexible display.

The basic structure of the present LCD is shown in FIG. 1 and at least comprises a liquid crystal display panel 100 and a backlight module 200. The liquid crystal panel itself does not emit light and needs the back light module to provide light source for normally showing images. As shown in FIG. 2, in the LCD structure according to prior art, only the flexible material is used to replace the rigid material to manufacture LCD. During the bending operation, the issues of the dislocation, the uneven gap, the light leakage may happen; besides, the ITO material employed for the transparent electrode is a kind of fragile material. In bent state, the brittle rupture can happen very easily. However, it is often to be the common electrode in the LCD and covers the area of the entire panel. Thus, as it is applied for flexible display, the condition of ITO common electrode rupture will easily happen. Therefore, as the LCD is used for flexible display application, the improvement is required for overcoming the aforesaid problems.

SUMMARY OF THE INVENTION

An objective of the present invention is to provide a flexible liquid crystal display to prevent that the brittle rupture of the common electrode layer happens during the bending operation, and meanwhile, to avoid the issues of the dislocation, the uneven gap, the light leakage during the bending operation.

For realizing the aforesaid objective, the present invention provides a flexible liquid crystal display, comprising a flexible backlight module and a flexible liquid crystal display panel positioned on the flexible backlight module, and the flexible liquid crystal display panel comprises a lower polarizer, an array substrate, a liquid crystal layer, a color filter substrate and an upper polarizer from bottom to top in sequence;

the color filter substrate comprises a first substrate, a color filter layer positioned on the first substrate, a flat layer positioned on the color filter layer, a common electrode layer positioned on the flat layer, a black matrix block wall positioned on the common electrode layer;

wherein the common electrode layer comprises a plurality of electrode blocks, which are separately positioned, and the plurality of electrode blocks are electrically connected with metal lines.

The color filter layer comprises red, green blue color filters, which are separately positioned.

A dimension of the electrode block covers at least one color filter.

The electrode block appears to be a rectangle, and a side length of the rectangle is 14 um-2117 um.

The array substrate comprises a second substrate, and a gate line, a data line, a thin film transistor array and a transparent electrode positioned on the second substrate.

Both the first substrate and the second substrate are flexible transparent substrates, and material of the flexible transparent substrates is glass, polymethylmethacrylate, polycarbonate, polyethylene, polypropylene, polyethylene glycol terephthalate or polyimide.

The flexible backlight module comprises a light guide plate adhered at a lower surface of the lower polarizer, a light source positioned at one lateral side of the light guide plate, a first reflector panel positioned at the other lateral side of the light guide plate opposite to the light source, and a second reflector panel positioned at a lower surface of the light guide plate.

The light guide plate is a flexible transparent substrate; the light guide plate is adhered to the lower polarizer with glue, and bonding the flexible backlight module and the flexible liquid crystal display panel together.

The light source comprises a troffer positioned at a lateral portion of the light guide plate, and a LED light bar positioned in the troffer.

Both a lower surface of the color filter substrate and an upper surface of the array substrate are provided with a vertical alignment layer, and liquid crystal material in the liquid crystal layer is negative type liquid crystal.

The present invention further provides a flexible liquid crystal display, comprising a flexible backlight module and a flexible liquid crystal display panel positioned on the flexible backlight module, and the flexible liquid crystal display panel comprises a lower polarizer, an array substrate, a liquid crystal layer, a color filter substrate and an upper polarizer from bottom to top in sequence;

the color filter substrate comprises a first substrate, a color filter layer positioned on the first substrate, a flat layer positioned on the color filter layer, a common electrode layer positioned on the flat layer, a black matrix block wall positioned on the common electrode layer;

wherein the common electrode layer comprises a plurality of electrode blocks, which are separately positioned, and the plurality of electrode blocks are electrically connected with metal lines;

wherein the color filter layer comprises red, green blue color filters, which are separately positioned;

wherein the electrode block appears to be a rectangle, and a side length of the rectangle is 14 um-2117 um;

wherein the array substrate comprises a second substrate, and a gate line, a data line, a thin film transistor array and a transparent electrode positioned on the second substrate;

wherein the flexible backlight module comprises a light guide plate adhered at a lower surface of the lower polarizer, a light source positioned at one lateral side of the light guide plate, a first reflector panel positioned at the other lateral side of the light guide plate opposite to the light source, and a second reflector panel positioned at a lower surface of the light guide plate;

wherein both a lower surface of the color filter substrate and an upper surface of the array substrate are provided with a vertical alignment layer, and liquid crystal material in the liquid crystal layer is negative type liquid crystal.

The benefits of the present invention are: the flexible liquid crystal display comprises flexible liquid crystal display panel and backlight module, and can be applied for flexible display. By separating the common electrode on the color filter substrate into the plurality of electrode blocks to make each electrode block cover one or more sub pixel areas. The plurality of electrode blocks are electrically connected with metal lines to effectively prevent that the brittle rupture of the common electrode layer happens during the bending operation as the liquid crystal display is applied for the flexible display; meanwhile, by providing the light guide plate, of which the scattering mesh dots are distributed on the lower surface thereof, and positioning the reflector panels at the bottom and the lateral side of the flexible light guide plate to promote the scattering result of the flexible light guide plate to the light and to raise the usage ratio of the light; moreover, by adhering the flexible light guide plate to the lower polarizer with glue, and thus, bonding the flexible backlight module and the flexible liquid crystal display panel together. Accordingly, the issues of the dislocation, the uneven gap, the light leakage can be avoided as the flexible backlight module and the flexible liquid crystal display panel are bent.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 3:
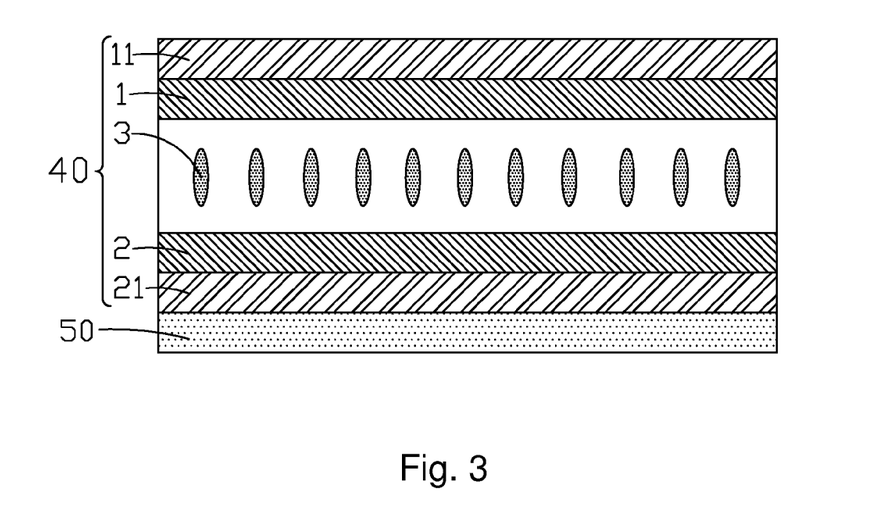
FIG. 3 is a sectional structure diagram of a first embodiment according to the flexible liquid crystal display of the present invention.

Please refer to FIG. 3 to FIG. 8 together. The present invention provides a flexible liquid crystal display. The flexible liquid crystal display comprises a flexible backlight module 50 and a flexible liquid crystal display panel 40 positioned on the flexible backlight module 50, and the flexible liquid crystal display panel 40 comprises a lower polarizer 21, an array substrate 2, a liquid crystal layer 3, a color filter substrate 1 and an upper polarizer 11 from bottom to top in sequence;

specifically, the color filter substrate 1 and the array substrate 2 are fixed together with seal and to form an accommodating space between the color filter substrate 1 and the array substrate 2 for filling the liquid crystal layer 3.

Figure 4:
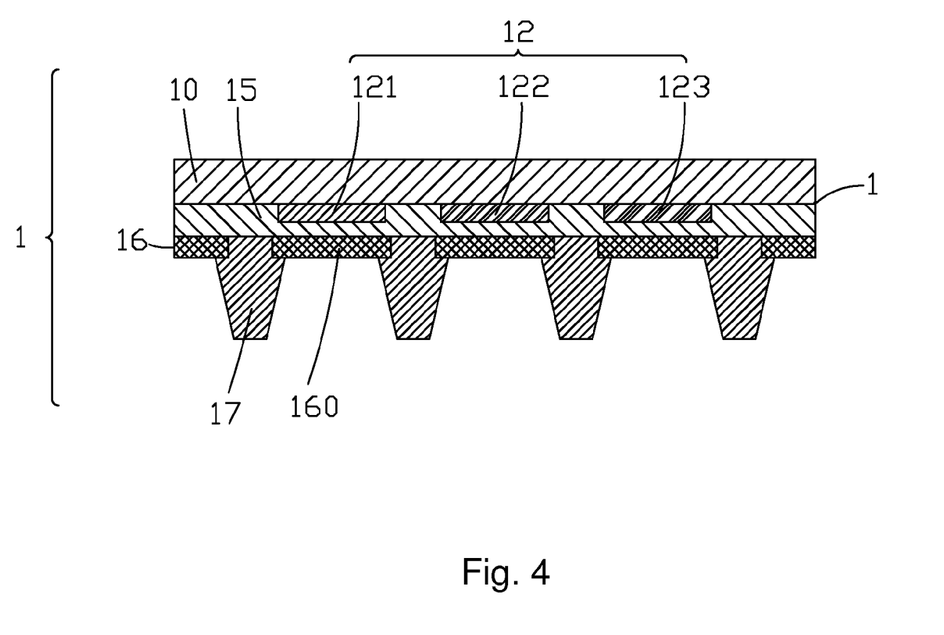
FIG. 4 is a sectional structure diagram of a first embodiment of a color filter substrate according to the flexible liquid crystal display of the present invention.

Specifically, the color filter substrate 1 comprises a first substrate 10, a color filter layer 12 positioned on the first substrate 10, a flat layer 15 positioned on the color filter layer 12, a common electrode layer 16 positioned on the flat layer 15, a black matrix block wall 17 positioned on the common electrode layer 16.

The first substrate is a flexible transparent substrate, and material of the flexible transparent substrate is glass, polymethylmethacrylate (PMMA), polycarbonate (PC), polyethylene (PE), polypropylene (PP), polyethylene glycol terephthalate (PET) or polyimide (PI).

The color filter layer 12 comprises red, green blue color filters 121, 122, 123, which are separately positioned; each of the color filters 121, 122 or 123 corresponds to one sub pixel of the flexible liquid crystal display.

Figure 6:
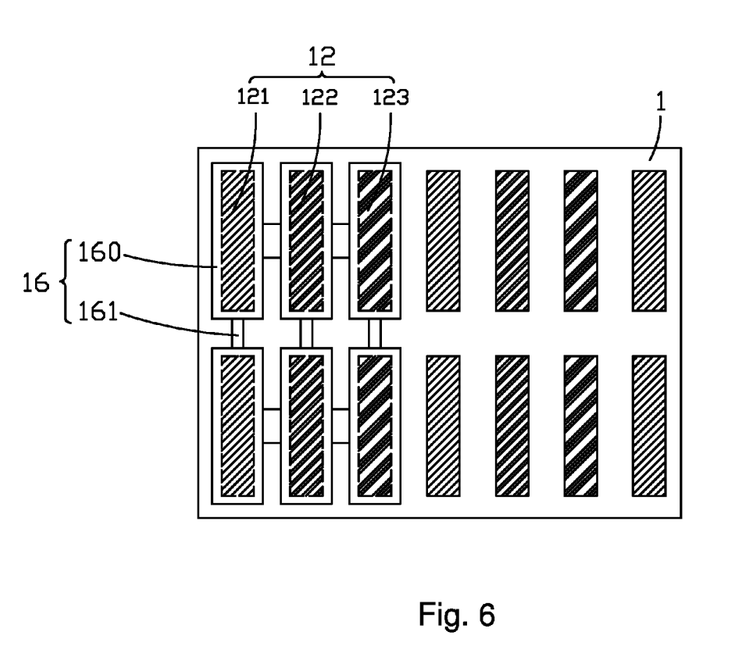
FIG. 6 is a structure diagram of a first embodiment of a common electrode layer according to the flexible liquid crystal display of the present invention.

Specifically, the common electrode layer 16 comprises a plurality of electrode blocks 160, which are separately positioned, and material of the electrode blocks 160 is Indium Tin Oxide (ITO), and the plurality of electrode blocks 160 are electrically connected with metal lines 161.

Figure 5:
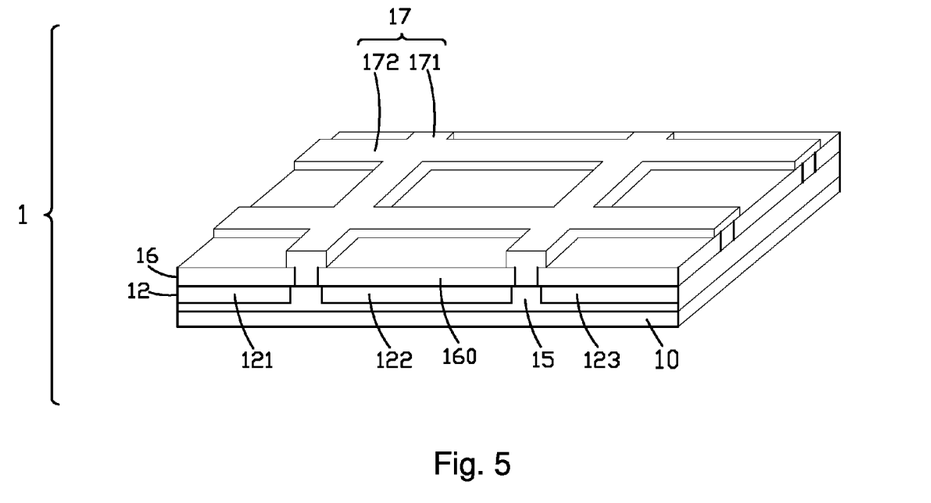
FIG. 5 is a stereoscopic structure diagram of a first embodiment of a color filter substrate according to the flexible liquid crystal display of the present invention.

AS shown in FIGS. 4-6, each electrode block 160 covers one color filter 121, 122 or 123. The different electrode blocks 160 are electrically connected with metal lines 161.

Specifically, the electrode block 160 can appear to be a rectangle or a shape like a rectangle, and a side length of the rectangle is 14 um-2117 um.

As shown in FIG. 5, the first substrate 10 appears to be a rectangle, and the rectangle has two long sides and two short sides connected to the two long sides. The black matrix block wall 17 comprises a plurality of longitudinal block walls 171 parallel with the short sides of the first substrate 10, and a plurality of transverse block walls 172 square crossing with the plurality of longitudinal block walls 171. All the longitudinal block walls 171 and the transverse block walls 172 are positioned in spaced areas among adjacent color filters. The borders of the color filters 121, 122 or 123 are on the longitudinal block walls 171 and the transverse block walls 172. Accordingly, the leakage of the background light in the spaced areas between two adjacent color filters can be prevented to raise the display contrast. Meanwhile, the mixture of the lights irradiated from two adjacent color filters can be prevented to increase the color purity of respective sub pixels.

The array substrate 2 comprises a second substrate, and a gate line, a data line, a thin film transistor array and a transparent electrode positioned on the second substrate.

The second substrate is a flexible transparent substrate, and material of the flexible transparent substrate is glass, polymethylmethacrylate, polycarbonate, polyethylene, polypropylene, polyethylene glycol terephthalate or polyimide.

Specifically, both a lower surface of the color filter substrate 1 and an upper surface of the array substrate 2 (i.e. the upper, lower two sides of the liquid crystal layer 3) are provided with a vertical alignment layer, and liquid crystal material in the liquid crystal layer 3 is negative type liquid crystal. In condition without applying voltages, the liquid crystal molecules in the liquid crystal layer 3 are aligned perpendicularly to the surfaces of the color filter substrate 1 and the array substrate 2. After the voltages are applied, the liquid crystal molecules in the liquid crystal layer 3 are aligned to lie down.

Specifically, the upper, lower polarizers 11, 21 are respectively adhered to an upper surface of the color filter substrate 1 and a lower surface of the array substrate 2. Meanwhile, absorption axles of the upper, lower polarizers 11, 21 are mutually perpendicular.

Figure 7:
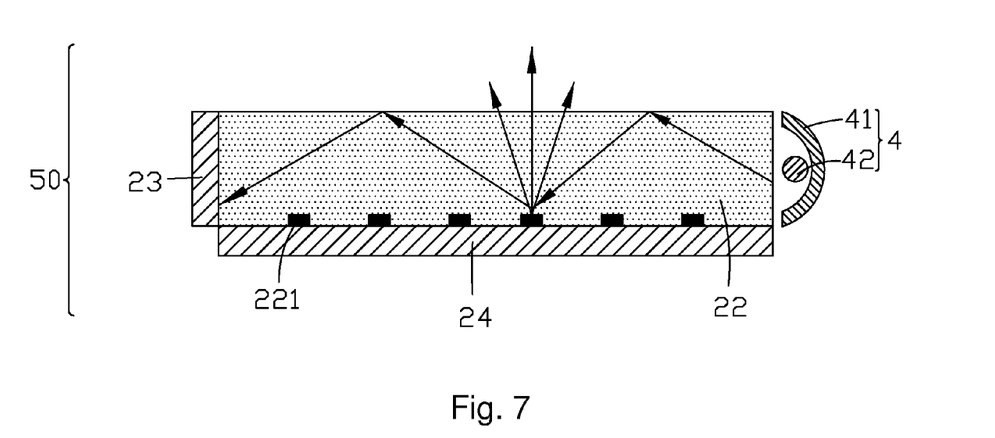
FIG. 7 is a sectional diagram of a first embodiment of a flexible backlight module according to the flexible liquid crystal display of the present invention.
Figure 8:
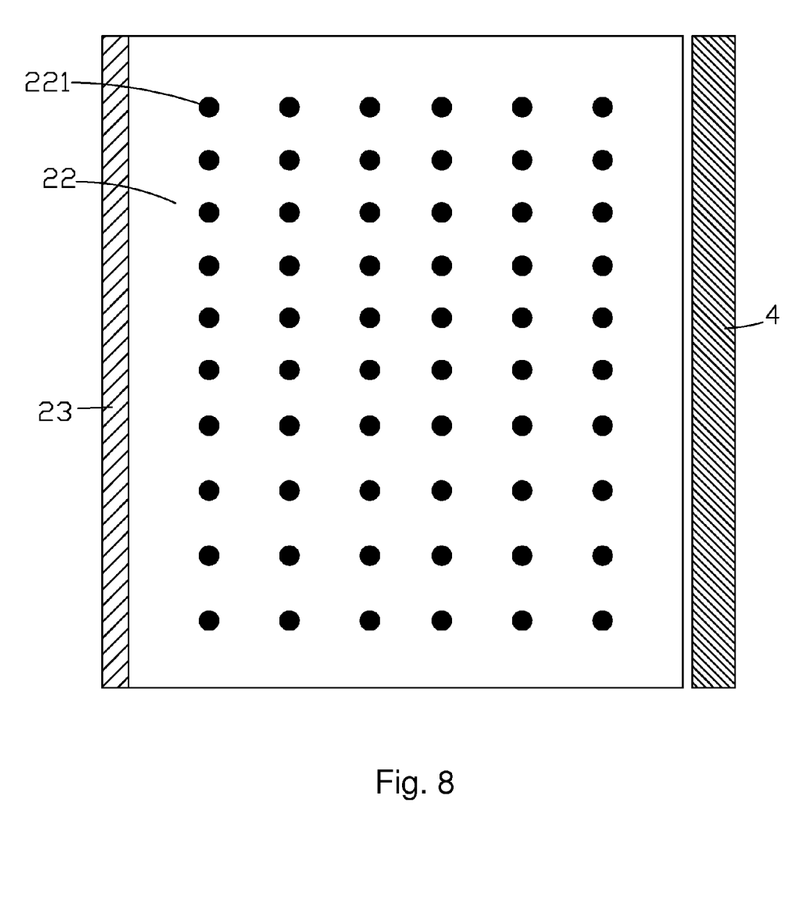
FIG. 8 is a top view diagram of a first embodiment of a flexible backlight module according to the flexible liquid crystal display of the present invention.

Please refer to FIGS. 7-8 and FIG. 1 at the same time. As what is shown, the flexible backlight module 50 comprises a light guide plate 22 adhered at a lower surface of the lower polarizer 21, a light source 4 positioned at one lateral side of the light guide plate 22, a first reflector panel 23 positioned at the other lateral side of the light guide plate 22 opposite to the light source 4, and a second reflector panel 24 positioned at a lower surface of the light guide plate 22.

Specifically, the light guide plate 22 is a flexible transparent substrate, and material of the flexible transparent substrate is glass, polymethylmethacrylate, polycarbonate, polyethylene, polypropylene, polyethylene glycol terephthalate or polyimide.

The light source 4 comprises a troffer 41 positioned at a lateral portion of the light guide plate 22, and a LED light bar 42 positioned in the troffer 41.

Furthermore, scattering mesh dots 221 are distributed on the lower surface of the light guide plate 22. The scattering mesh dots 221 function to scatter light and destroy the total inner reflection of the light for guiding the light from the upper surface of the light guide plate 22 to increase the scattering result of the light guide plate 22 to the light.

Specifically, the light guide plate 22 is adhered to the lower polarizer 21 with glue, and bonding the flexible backlight module 50 and the flexible liquid crystal display panel 40 together. It is capable of effectively avoiding the issues of the dislocation, the uneven gap, the light leakage when the flexible backlight module 50 and the flexible liquid crystal display panel 40 are bent together.

The present invention respectively provides the first reflector panel 23 and the second reflector panel 24 at the bottom of the light guide plate 22 and the lateral part opposite to the light source 4 to raise the usage ratio of the light.

Figure 9:
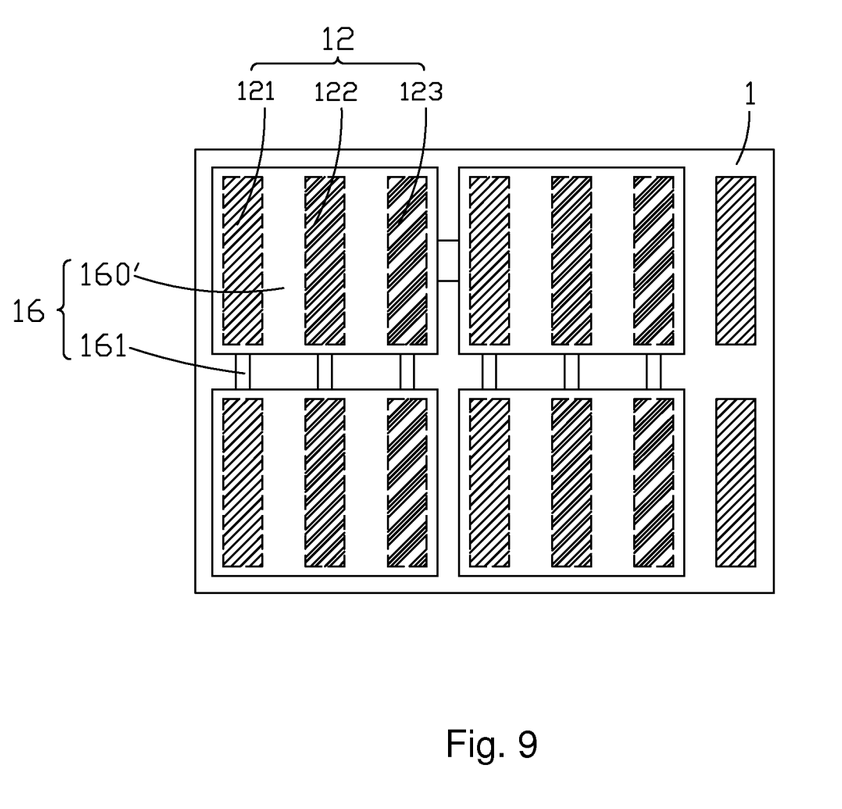
FIG. 9 is a structure diagram of a second embodiment of a common electrode layer according to the flexible liquid crystal display of the present invention.

Please refer to FIG. 9. The present invention further provides a second embodiment of the flexible liquid crystal display. The difference from the first embodiment is that the structure of the common electrode 16 on the color filter substrate 1 is different. Namely, the dimension and shape of the electrode block 160' is different. In the second embodiment, each electrode block 160' covers the red, green, blue, three color filters 121, 122, 123, which are aligned in sequence. The different electrode blocks 160' are electrically connected with metal lines 161'.

Specifically, the electrode block 160' can appear to be a rectangle or a shape like a rectangle, and a side length of the rectangle is 14 um-2117 um.

In the first embodiment and the second embodiment according to the flexible liquid crystal display of the present invention, the structure and material of the rest portions are identical except that the common electrode 16 in the color filter substrate 1 is different.

What can be considered is that except the aforesaid first embodiment and the second embodiment, the electrode 160 or 160' in the present invention also can cover two adjacent color filters, or cover at least three adjacent color filters.

In conclusion, the flexible liquid crystal display comprises flexible liquid crystal display panel and backlight module, and can be applied for flexible display. By separating the common electrode on the color filter substrate into the plurality of electrode blocks to make each electrode block cover one or more sub pixel areas. The plurality of electrode blocks are electrically connected with metal lines to effectively prevent that the brittle rupture of the common electrode layer happens during the bending operation as the liquid crystal display is applied for the flexible display; meanwhile, by providing the light guide plate, of which the scattering mesh dots are distributed on the lower surface thereof, and positioning the reflector panels at the bottom and the lateral side of the flexible light guide plate to promote the scattering result of the flexible light guide plate to the light and to raise the usage ratio of the light; moreover, by adhering the flexible light guide plate to the lower polarizer with glue, and thus, bonding the flexible backlight module and the flexible liquid crystal display panel together. Accordingly, the issues of the dislocation, the uneven gap, the light leakage can be avoided as the flexible backlight module and the flexible liquid crystal display panel are bent.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A flexible liquid crystal display, comprising a flexible backlight module and a flexible liquid crystal display panel positioned on the flexible backlight module, and the flexible liquid crystal display panel comprises a lower polarizer, an array substrate, a liquid crystal layer, a color filter substrate and an upper polarizer from bottom to top in sequence;

the color filter substrate comprises a first substrate, a color filter layer positioned on the first substrate, a flat layer positioned on the color filter layer, a common electrode layer positioned on the flat layer, a black matrix block wall positioned on the common electrode layer;

wherein the common electrode layer comprises a plurality of electrode blocks, which are separately positioned, and the plurality of electrode blocks are electrically connected with metal lines.

2. The flexible liquid crystal display according to claim 1, wherein the color filter layer comprises red, green blue color filters, which are separately positioned.

3. The flexible liquid crystal display according to claim 2, wherein a dimension of the electrode block covers at least one color filter.

4. The flexible liquid crystal display according to claim 1, wherein the electrode block appears to be a rectangle, and a side length of the rectangle is 14 um-2117 um.

5. The flexible liquid crystal display according to claim 1, wherein the array substrate comprises a second substrate, and a gate line, a data line, a thin film transistor array and a transparent electrode positioned on the second substrate.

6. The flexible liquid crystal display according to claim 5, wherein both the first substrate and the second substrate are flexible transparent substrates, and material of the flexible transparent substrates is glass, polymethylmethacrylate, polycarbonate, polyethylene, polypropylene, polyethylene glycol terephthalate or polyimide.

7. The flexible liquid crystal display according to claim 1, wherein the flexible backlight module comprises a light guide plate adhered at a lower surface of the lower polarizer, a light source positioned at one lateral side of the light guide plate, a first reflector panel positioned at the other lateral side of the light guide plate opposite to the light source, and a second reflector panel positioned at a lower surface of the light guide plate.

8. The flexible liquid crystal display according to claim 7, wherein the light guide plate is a flexible transparent substrate; the light guide plate is adhered to the lower polarizer with glue, and bonding the flexible backlight module and the flexible liquid crystal display panel together.

9. The flexible liquid crystal display according to claim 7, wherein the light source comprises a troffer positioned at a lateral portion of the light guide plate, and a LED light bar positioned in the troffer.

10. The flexible liquid crystal display according to claim 1, wherein both a lower surface of the color filter substrate and an upper surface of the array substrate are provided with a vertical alignment layer, and liquid crystal material in the liquid crystal layer is negative type liquid crystal.

11. A flexible liquid crystal display, comprising a flexible backlight module and a flexible liquid crystal display panel positioned on the flexible backlight module, and the flexible liquid crystal display panel comprises a lower polarizer, an array substrate, a liquid crystal layer, a color filter substrate and an upper polarizer from bottom to top in sequence;
the color filter substrate comprises a first substrate, a color filter layer positioned on the first substrate, a flat layer positioned on the color filter layer, a common electrode layer positioned on the flat layer, a black matrix block wall positioned on the common electrode layer;
wherein the common electrode layer comprises a plurality of electrode blocks, which are separately positioned, and the plurality of electrode blocks are electrically connected with metal lines;
wherein the color filter layer comprises red, green blue color filters, which are separately positioned;
wherein the electrode block appears to be a rectangle, and a side length of the rectangle is 14 um-2117 um;
wherein the array substrate comprises a second substrate, and a gate line, a data line, a thin film transistor array and a transparent electrode positioned on the second substrate;
wherein the flexible backlight module comprises a light guide plate adhered at a lower surface of the lower polarizer, a light source positioned at one lateral side of the light guide plate, a first reflector panel positioned at the other lateral side of the light guide plate opposite to the light source, and a second reflector panel positioned at a lower surface of the light guide plate;
wherein both a lower surface of the color filter substrate and an upper surface of the array substrate are provided with a vertical alignment layer, and liquid crystal material in the liquid crystal layer is negative type liquid crystal.

12. The flexible liquid crystal display according to claim 11, wherein a dimension of the electrode block covers at least one color filter.

13. The flexible liquid crystal display according to claim 11, wherein both the first substrate and the second substrate are flexible transparent substrates, and material of the flexible transparent substrates is glass, polymethylmethacrylate, polycarbonate, polyethylene, polypropylene, polyethylene glycol terephthalate or polyimide.

14. The flexible liquid crystal display according to claim 11, wherein the light guide plate is a flexible transparent substrate; the light guide plate is adhered to the lower polarizer with glue, and bonding the flexible backlight module and the flexible liquid crystal display panel together.

15. The flexible liquid crystal display according to claim 11, wherein the light source comprises a troffer positioned at a lateral portion of the light guide plate, and a LED light bar positioned in the troffer.

* * * * *